United States Patent
Cope (10) Patent No.: US 9,049,084 B1
(45) Date of Patent: Jun. 2, 2015

(54) UTILIZING AN OFFSET QPSK SIGNAL TO TRANSMIT TWO DIGITAL SYMBOLS

(71) Applicant: SPRINT COMMUNICATIONS COMPANY L.P., Overland Park, KS (US)

(72) Inventor: Warren Bruce Cope, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 29 days.

(21) Appl. No.: 13/780,625

(22) Filed: Feb. 28, 2013

(51) Int. Cl.
*H04L 27/10* (2006.01)
*H04L 27/18* (2006.01)
*H04L 27/20* (2006.01)
*H04L 27/34* (2006.01)

(52) U.S. Cl.
CPC .............. *H04L 27/186* (2013.01); *H04L 27/20* (2013.01); *H04L 27/183* (2013.01); *H04L 27/3405* (2013.01)

(58) Field of Classification Search
CPC . H04L 27/183; H04L 27/186; H04L 27/2604; H04L 27/3405
See application file for complete search history.

(56) References Cited

U.S. PATENT DOCUMENTS

| | | | | |
|---|---|---|---|---|
| 6,307,890 B1* | 10/2001 | Dyson et al. | | 375/265 |
| 7,078,981 B2* | 7/2006 | Farag | | 332/103 |
| 8,036,310 B2* | 10/2011 | Ban | | 375/308 |
| 8,705,658 B2* | 4/2014 | Seo et al. | | 375/308 |
| 2009/0060090 A1* | 3/2009 | Ban | | 375/308 |
| 2010/0284491 A1* | 11/2010 | Chen et al. | | 375/308 |
| 2013/0127558 A1* | 5/2013 | Clevorn | | 332/183 |

* cited by examiner

*Primary Examiner* — Sophia Vlahos (57) ABSTRACT

Systems, methods, and computer-readable media, for facilitating transmission of offset QPSK signals indicating two digital symbols. In some embodiments, a first digital symbol of a first digital information unit and a first digital symbol of a second digital information unit are used to identify a first signal attribute associated with a sine wave and a second signal attributed associated with a cosine wave. Thereafter, an offset QPSK signal is generated using the first signal attribute in association with the sine wave and the second signal attribute in association with the cosine wave to encode both the first digital symbol and the second digital symbol within the offset QPSK signal.

20 Claims, 6 Drawing Sheets

UTILIZING AN OFFSET QPSK SIGNAL TO TRANSMIT TWO DIGITAL SYMBOLS

BRIEF SUMMARY

A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

In brief, and at a high level, this disclosure describes, among other things, facilitating utilization of offset QPSK signals to transmit two digital symbols. Utilizing embodiments hereof, two digital symbols (e.g., associated with different eight-bit binary representations) can be encoded in a single offset QPSK signal. In this way, an offset amplitude of an in-phase signal and/or an offset amplitude of a quadrature signal can encode or provide an indication of two different digital symbols.

BRIEF DESCRIPTION OF THE DRAWINGS

Illustrative embodiments of the present invention are described in detail below with reference to the attached drawing figures, and wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

3G Third-Generation Wireless Technology
4G Fourth-Generation Cellular Communication System
CD-ROM Compact Disk Read Only Memory
CDMA Code Division Multiple Access
CINR Carrier to Interference Plus Noise Ratio
Eb/No Energy per Bit to Noise Power Spectral Density Ratio
GIS Geographic/Geographical/Geospatial Information System
GPRS General Packet Radio Service
GSM Global System for Mobile communications: originally from Groupe Special Mobile
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple-Input and Multiple-Output
PC Personal Computer
PCS Personal Communications Service
PDA Personal Digital Assistant
PSK Phase-Shift Keying
QPSK Quadrature Phase-Shift Keying
RAM Random Access Memory
ROM Read Only Memory
SINR Signal to Interference Plus Noise Ratio
TDMA Time Division Multiple Access
UMTS Universal Mobile Telecommunications Systems Further, various technical terms are used throughout this description. An illustrative resource that fleshes out various aspects of these terms can be found in Newton's Telecom Dictionary, 26th Edition (2011).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
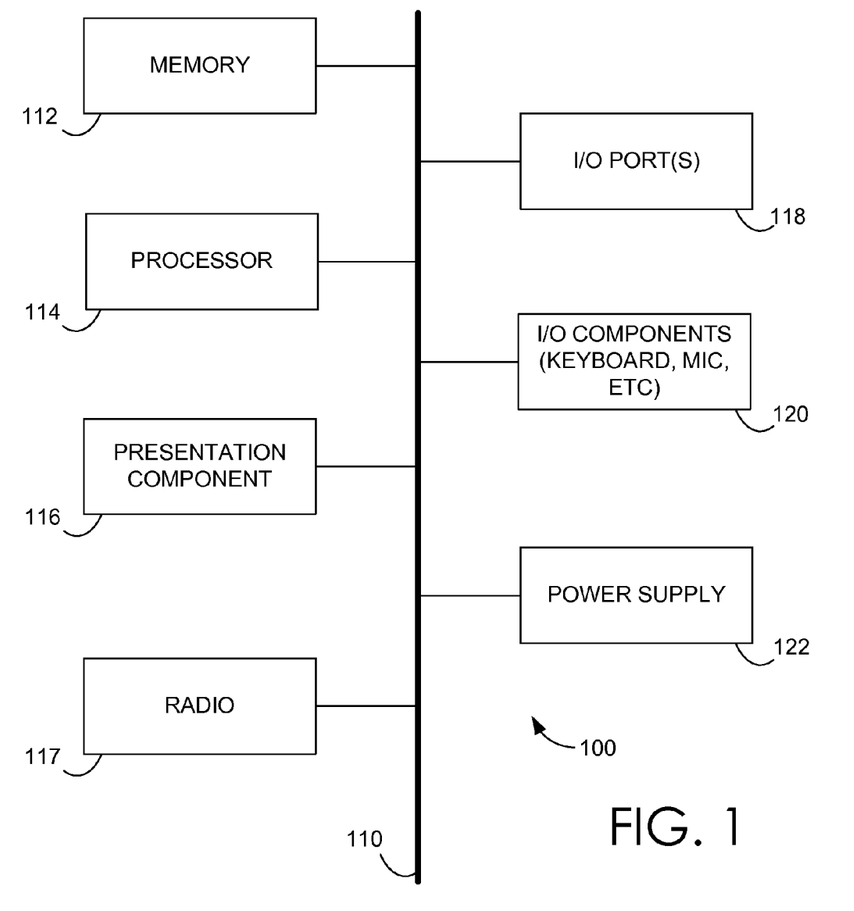
FIG. 1 depicts an exemplary computing device according to embodiments of the present invention.

Referring to the drawings in general, and initially to FIG. 1 in particular, a block diagram of an illustrative communications device according to one embodiment is provided and referenced generally by the numeral 100. Although some components are shown in the singular, they may be plural. For example, communications device 100 might include multiple processors processor 114, a presentation component 116, a radio 117 (if applicable), input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include CDMA, GPRS, TDMA, GSM, WiMax, LTE, and the like. In some embodiments, radio 117 might also facilitate other types of wireless communications including Wi-Fi communications and GIS communications. As can be appreciated, in various embodiments, radio 117 can be configured to support multiple technologies and/or multiple radios can be utilized to support a technology or multiple technologies.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

Embodiments of the present invention facilitate using an offset QPSK signal to transmit two digital symbols. Utilizing embodiments hereof, a single offset QPSK signal can be used to transmit an indication or representation of two digital symbols as opposed to a single digital symbol. In one embodiment, the two digital symbols are associated with different data streams. As such, a portion of two different data streams can be simultaneously or concurrently transmitted to a user device using a single offset QPSK signal. As described below, an offset QPSK signal can include two digital symbols encoded in the signal. In this regard, two different digital symbols (e.g., associated with two different data streams) can be detected or discerned from a single offset QPSK signal based on the quadrant associated with the signal and an offset from a virtual center of the quadrant, as described in more detail below.

Utilizing an offset QPSK signal to transmit an indication of two digital symbols, for example, associated with two different data streams, can enable use of excess power accessible to a user device. Accordingly, aspects of the present invention allow a transmitter to modify a QPSK signal (e.g., pattern) during a strong period of performance in a QPSK environment such that multiple digital symbols can be embedded or represented in the offset QPSK signal. As a result, when a user device is in a QPSK region receiving more power than is needed for QPSK modulation and/or demodulation to operate effectively, a transmitter and receiver can operate to allow transmission of twice the amount of data thereby significantly increasing the throughput to a user device in a QPSK environment.

By way of example only, assume a data stream providing a video is being transmitted from a transmitter to a user device. Further assume that the user device is located in a range or vicinity from the transmitter that is receiving a power exceeding a threshold within a QPSK environment. Such a power threshold can be any value of power that, if exceeded, results in implementation of offset QPSK signals. Power can be measured in any manner, such as, for example, Eb/No, SINR, CINR, etc. When the user device is receiving such a power in a QPSK area, an offset QPSK signal can be used to simultaneously or concurrently communicate an indication of a digital symbol associated with the data stream providing a video and a digital symbol associated with another data stream, such as a data streaming providing video enhancements. In this way, digital representations associated with two different data streams can be transmitted using a single offset QPSK thereby increasing throughput to the user device. In another embodiment, an offset QPSK signal can be used to simultaneously or concurrently send an indication of a first digital symbol associated with the data stream providing a video and a second digital symbol associated with the same data stream providing the same video. As such, two different digital symbols associated with a single data stream (and even a same eight-bit representation) can be provided to the user device using a single offset QPSK signal thereby increasing throughput to the user device.

Accordingly, in one aspect, the present invention is directed to one or more computer-readable media having computer-executable instructions embodied thereon that, when executed, perform a method for facilitating transmission of offset QPSK signals indicating two digital symbols. The method includes using a first digital symbol of a first digital information unit and a first digital symbol of a second digital information unit to identify a first signal attribute associated with a sine wave and a second signal attributed associated with a cosine wave. An offset QPSK signal is generated using the first signal attribute in association with the sine wave and the second signal attribute in association with the cosine wave to encode both the first digital symbol and the second digital symbol within the offset QPSK signal.

In another aspect, embodiments of the present invention are directed to a method for facilitating transmission of offset QPSK signals indicating two digital symbols. The method includes using a first two-bit portion of a first eight-bit binary value to identify an initial amplitude associated with a sine wave and an initial amplitude associated with a cosine wave. The method also includes using a second two-bit portion of a second eight-bit binary value to identify a first offset amplitude associated with the sine wave, the first offset amplitude being offset from the initial amplitude associated with the sine wave in accordance with the second two-bit portion, and to identify a second offset amplitude associated with the cosine wave, the second offset amplitude being offset from the initial amplitude associated with the cosine wave in accordance with the second two-bit portion. The method further includes generating an offset QPSK signal based on the first offset amplitude associated with the sine wave and the second offset amplitude associated with the cosine wave.

In yet another aspect, a method for facilitating transmission of offset QPSK signals indicating two digital symbols is provided. The method includes receiving at a user device an offset QPSK signal including a sine waveform and a cosine waveform. The method also includes using an amplitude associated with the sine waveform and an amplitude associated with the cosine waveform to identify a first digital symbol associated with a first digital information unit and a second digital symbol associated with a second digital information unit.

Figure 2:
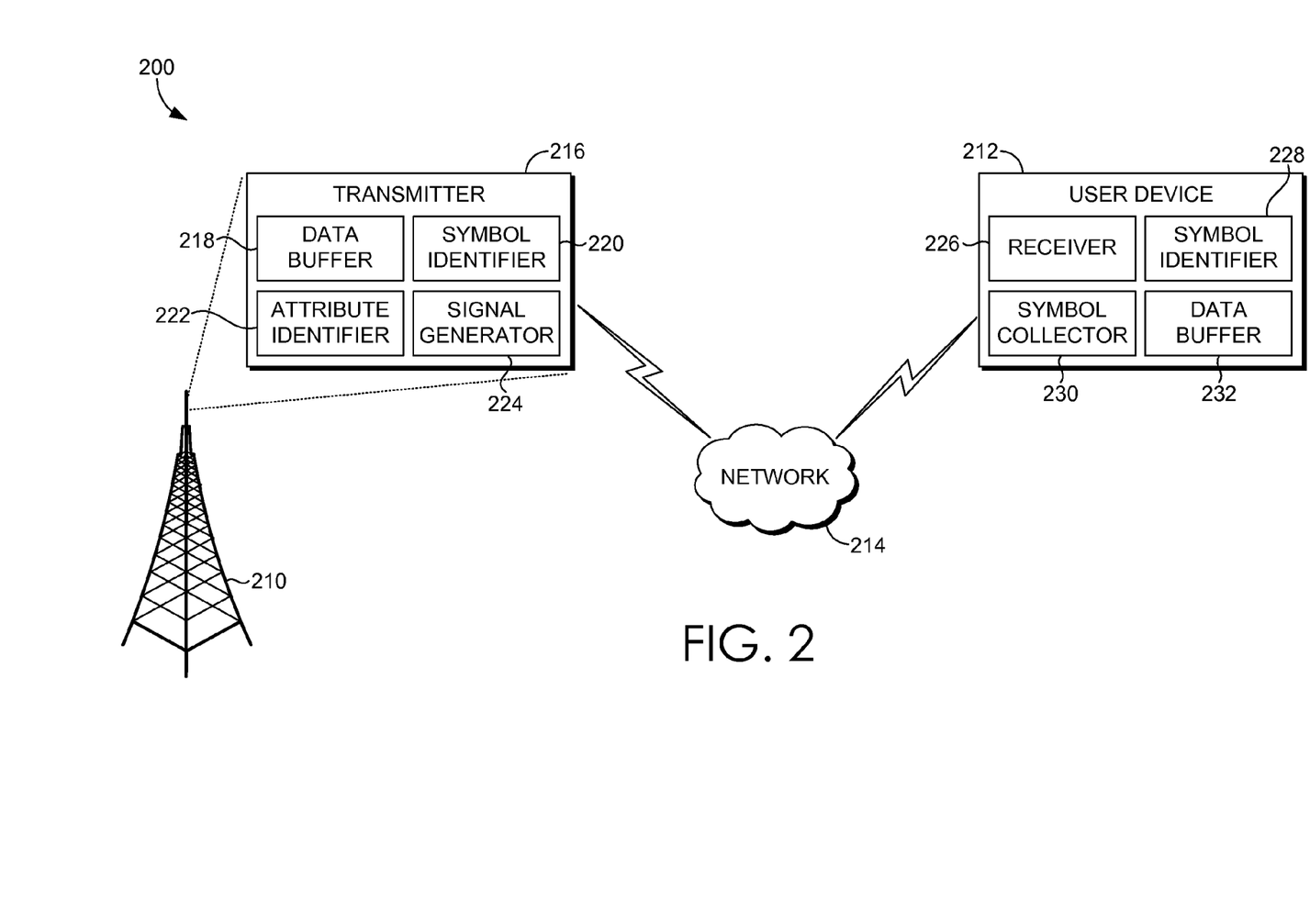
FIG. 2 is a schematic view of an exemplary communications environment suitable for use in implementing embodiments of the present invention.

Turning now to FIG. 2, an exemplary network environment suitable for use in implementing embodiments of the present invention is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

In the network environment 200, a base station 210 may communicate with a user device 212 via a network(s) 214. Network 214 might be a single network or multiple networks, as well as being a network of networks. In embodiments, network 214 is or includes a wireless network (e.g., a wireless telecommunications network). A wireless telecommunications network refers to any type of telecommunications network that is wireless. Examples of wireless telecommunications technologies include, but are not limited to, Global System for Mobile Communications (GSM), General Packet Radio Service (GPRS), Code Division Multiple Access (CDMA), CDMA2000, CDMAOne, Time Division Multiple Access (TDMA), Long Term Evolution (LTE), Universal Mobile Telecommunications Systems (UMTS), Integrated Digital Enhanced Network (iDEN), WiMAX, 3G, 4G, and Personal Communications Service (PCS). In one embodiment, network 214 is or includes a network, such as LTE, that uses MIMO technology. A wireless telecommunications network might include an array of devices. Components such as a base station, a communications tower, or even access points (as well as other components) can provide wireless connectivity in some embodiments.

The base station 210 includes a transmitter 216 configured to facilitate transmission of offset QPSK signals. QPSK refers to quadrature phase-shift keying. In embodiments, QPSK might be referred to as quaternary PSK, quadriphase PSK, 4-PSK, or 4-QAM. Phase-shift keying or PSK refers to a digital modulation implementation that conveys data by modifying or modulating a phase of a signal. PSK uses a number of phases that each encode a number of bits. In QPSK, four phases are generally used with four constellation points on a constellation diagram being used. In such a case, QPSK can encode two bits per digital symbol.

A QPSK signal refers to a signal or radio wave that can be wirelessly transmitted and conveys or encodes a digital symbol within the signal. An offset QPSK signal refers to a signal or radio wave that can be wirelessly transmitted that conveys or encodes two digital symbols within the signal. As previously described, the two digital symbols can be associated with the same data streams or with different data streams or the same or different digital information units (e.g., eight-bit representations of binary code). In embodiments, an offset QPSK signal includes an offset amplitude of an in-phase signal (I signal) and/or an offset amplitude of a quadrature signal (Q signal). In this way, a sinusoid representing an in-phase component and a sinusoid representing a quadrature-phase component can together (e.g., superimposed) be used to result in an offset QPSK signal.

Generally, the transmitter 216 can generate a radio frequency alternating current that can be applied to an antenna(s) (not shown) of the base station 210 that can radiate offset QPSK signals (i.e., radio waves). The transmitter 216 can perform modulation to encode two digital symbols in a signal thereby resulting in transmission of an offset QPSK signal. Generally, modulation is the process of varying one or more properties of a periodic waveform with a modulating signal which contains information to be transmitted. For example, amplitude, phase, and/or frequency of a periodic waveform can be modified. Modulation facilitates conveying digital symbols inside another signal that can be physically transmitted. Offset modulation refers to modulation that facilitates conveying multiple digital symbols within a signal that can be physically transmitted (e.g., offset QPSK signal). The even (or odd) bits can be used to modulate the in-phase component, and the odd (or even) bits can be used to modulate the quadrature-phase component.

In some embodiments, a determination may be made as to whether to perform offset QPSK modulation. Stated differently, a determination of whether to utilize an offset QPSK signal(s) may be determined. In some cases, an offset QPSK signal may be used in association with a user device positioned within a QPSK environment having power capabilities that exceed a power threshold. A user device may be within a QPSK environment when the user device is within a range of distances from a base station or is receiving QPSK services. In embodiments, QPSK services may be provided when error rates associated with 16 QAM increase or exceed a threshold.

A power threshold can be an indication or value of power that, if exceeded, results in implementation of utilizing offset QPSK signals. Power can be measured in any manner, such as, for example Eb/No, SINR, CINR, SNR, etc. As such, when a user device receives or is capable of receiving power above a predetermined threshold, offset QPSK signals can be utilized to increase throughput to the user device. By way of example only, assume that a signal-to-noise ratio of 4 decibels (dB) is approximately needed for minimal errors in demodulating data. That is, if a signal-to-noise ratio for a user device drops below 4 dB, bit errors may be more likely to occur thereby increasing the bit error rate. By contrast, if a signal-to-noise ratio (e.g., Eb/No) for a user device is above 4 dB, data is more likely to be correctly demodulated. As a result, a power threshold of 4 dB may be used such that excess power is utilized by a user device when the signal-to-noise ratio associated with the user device exceeds the power threshold of 4 dB (e.g., Eb/No).

In accordance with utilizing an offset QPSK modulation implementation, the transmitter 216 may include a data buffer 218, a symbol identifier 220, an attribute identifier 222, and a signal generator 224. The transmitter 216 can include any number of components and those specified herein are not intended to limit the scope of the invention. Neither should the transmitter 216 be interpreted as having any dependency or requirement relating to any one or combination of components illustrated.

The data buffer 218 of the transmitter 216 can be used to buffer data. Such a data buffer can temporarily store received data. The data buffer 218 can buffer data associated with any number of data streams, any number of digital information units (e.g., sequence of eight-bits of binary representations) and any number of user devices. By way of example only, the data buffer 218 can buffer a first data stream to be transmitted to the user device 212 and a second data stream to be transmitted to the user device 212. Each of the first data stream and the second data stream may include multiple digital information units, such as a sequence of eight bits. A digital information unit refers to a sequence of bits. In embodiments, a digital information unit includes a sequence of eight bits of binary code.

The symbol identifier 220 is configured to identify one or more digital symbols within a data stream(s), or a portion thereof. A digital symbol refers to at least a portion of a digital information unit (e.g., eight bits of binary code) that represents binary code. In embodiments, a digital symbol in a QPSK environment is two bits of an eight-bit value that is or can be encoded in a QPSK signal or an offset QPSK signal. In implementation, two bits per digital symbol can refer to a baud providing bits per second per hertz of performance. In the case that a digital symbol is two bits of an eight-bit value, the symbol identifier 220 identifies four digital symbols within an eight-bit representation.

The symbol identifier 220 can identify digital symbols associated with any number of digital information units and/or data streams. Such digital symbol identification associated with different digital information units and/or data streams may occur sequentially or simultaneously. For example, as the offset QPSK modulation implementation can encode two digital symbols in a single offset QPSK symbol, the symbol identifier 220 can identify digital symbols from two different data streams at or near simultaneous in time from one another.

In accordance with identifying digital symbols, the symbol identifier 220 can organize or stack the digital symbols in order as the symbols are to be transmitted. Digital symbols can be organized or arranged in association with any number of digital information units and/or data streams. Such digital symbol organization associated with different digital information units and/or data streams may occur sequentially or simultaneously. For example, as the offset QPSK modulation implementation can encode two digital symbols in a single offset QPSK symbol, the symbol identifier 220 can organize digital symbols from two different data streams at or near simultaneous in time from one another.

By way of example only, assume that data buffer 218 includes a first eight-bit data representation of 10110110 and a second eight-bit data representation of 11011000. In such a case, the symbol identifier 220 may identify digital symbols associated with the first representation as 10, 11, 01, and 10, and organize accordingly. Similarly, the symbol identifier 220 may identify digital symbols associated with the second representation as 11, 01, 10, and 00 and organize accordingly. In this regard, a first transmission of offset QPSK signals may encode "10" of the first data representation and "11" of the second data representation, while a second set of offset QPSK signals subsequently transmitted may encode "11" of the first data representation and "01" of the second data representation.

The attribute identifier 222 is configured to identify signal attributes. In some embodiments, the attribute identifier 222 identifies signal attributes by looking up signal attributes based on digital symbols or mapping digital symbols to signal attributes. A signal attribute refers to any attribute that can be used to provide or indicate an offset QPSK signal. A signal attribute may be, for example, an amplitude value, a frequency value, or a phase value. An attribute, such as a phase, frequency, or amplitude, can be assigned or correlated with a particular digital symbol (e.g., two binary bit representation). In embodiments, a signal attribute(s) is used to indicate or encode a particular number of bits, such as for example, a digital symbol having two bits. In this way, a digital symbol is represented by a particular attribute such as a phase, frequency or amplitude.

In a QPSK implementation, a QPSK signal includes an in-phase signal or waveform (i.e., an I signal) and a quadrature signal or waveform (i.e., a Q signal) that are used in combination to represent a digital symbol(s). As such, signal attributes can be an amplitude value associated with an I signal and an amplitude value associated with a Q signal. Signal attributes can be represented on a constellation diagram that indicates the amplitude of the in-phase signal, that is the I signal, along the x-axis and the amplitude of the quadrature, that is the Q signal, along the y-axis for each digital symbol. In this regard, each digital symbol of two-bit binary code corresponds with an I signal along the x-axis and a Q signal along the y-axis. The amplitude of each point or constellation point along the in-phase axis can be used to modulate a wave (e.g., a sine wave), and the amplitude along the quadrature axis can be used to modulate another wave (e.g., a cosine wave). Although described as the in-phase amplitude being used to modulate a sine wave and the quadrature amplitude being used to modulate a cosine wave, embodiments of the invention are not limited thereto. That is, the in-phase amplitude can be used to modulate a cosine wave while the quadrature amplitude can be used to modulate a sine wave.

In a traditional QPSK modulation implementation, the constellation points are generally positioned with uniform angular spacing around a circle thereby providing maximum phase-separation between adjacent points. Positioning along a circle enables QPSK signals to be transmitted with the same energy. A digital symbol, such as a 2-bit representation of data, is represented by a constellation point in a quadrant.

Figure 3:
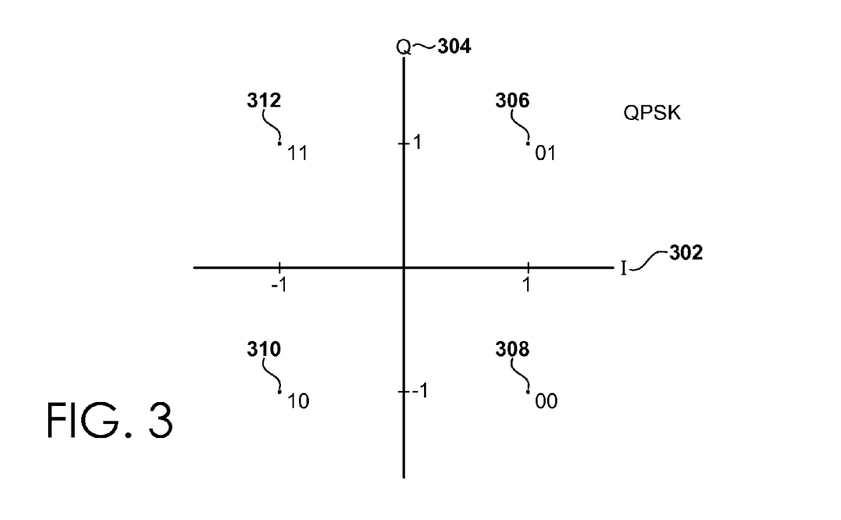
FIG. 3 depicts a constellation diagram used in QPSK modulation implementations.

For example, and with reference to FIG. 3, the I signal 302 is represented along the x-axis and the Q signal 304 is represented along the y-axis. As illustrated, a digital symbol of 01 is represented by a constellation point 306 in a first quadrant, a digital symbol of 00 is represented by a constellation point 308 in a second quadrant, a digital symbol of 10 is represented by a constellation point 310 in a third quadrant, and a digital symbol of 11 is represented by a constellation point 312 in a fourth quadrant. In FIG. 3, the constellation point 306 illustrated in the first quadrant might have an in-phase amplitude of 1 and a quadrature amplitude of 1, while the constellation point 310 illustrated in the third quadrant might have an in-phase amplitude of −1 and a quadrature amplitude of −1. FIG. 3 is merely for illustrative purposes. As such, each of the digital symbols represented could be represented in different quadrants. For instance, the digital symbol "11" could correspond with the first quadrant. Further, the amplitude values of +1 and −1 are not restricted to such an implementation. For example, the constellation points could fall at +0.5 and −0.5 values.

In an offset QPSK modulation implementation, constellation points are offset within a quadrant to provide an indication or representation of a first digital symbol and a second digital symbol. In this regard, rather than transmitting an indication of a constellation point in a predetermined position within a quadrant, such as the center, the constellation point is offset from the virtual predetermined position (e.g., center) to encode a first and second digital symbol. That is, instead of transmitting an indication of a standard constellation point (e.g., at a predetermined position within a quadrant), a first digital symbol is indicated based on a quadrant associated the first digital symbol and a second digital symbol is used to offset the constellation point initially representing the first digital symbol. In this way, a quadrant is used to indicate a first digital symbol and an offset from a virtual position within the quadrant (or a placement therein) is used to indicate a second digital symbol.

In one embodiment, the attribute identifier 222 uses a first digital symbol (e.g., two bits) to identify a first signal attribute that is an in-phase amplitude for an I signal (e.g., a sine waveform) and a second signal attribute that is a quadrature amplitude for a Q signal (e.g., a cosine waveform). To identify or determine such signal attributes, a first digital symbol is initially analyzed. As each quadrant, or constellation point therein, within a constellation graph is associated digital symbol, the quadrant and/or I and Q coordinates or values associated with therewith are identified. In this way, as illustrated in FIG. 3, a digital symbol of "01" can be mapped to a first quadrant associated with a constellation point having a 1 I value and a 1 Q value. As another example, a digital symbol of "11" can be mapped to a fourth quadrant associated with a constellation point having a −1 I value and a 1 Q value. As such, the attribute identifier 222 can identify an initial I value and an initial Q value associated with the first digital symbol.

To offset the I and/or Q values to result in an offset QPSK signal, the attribute identifier 22 can analyze a second digital symbol that is also to be encoded or represented in the offset QPSK signal. Offsetting the I and/or Q values might occur in any number of manners. In one implementation, a determination of a quadrant for the second digital symbol might be identified. For example, a virtual quadrant within the initial quadrant might be selected in accordance with the second digital symbol. Based on the quadrant associated with the second digital symbol, the initial I value and initial Q value can be adjusted or modified accordingly. For instance, if a second digital symbol is associated with an upper-right virtual quadrant, the initial values might be adjusted in a positive I and a positive Q direction. In another example, if a second digital symbol is associated with a lower-right virtual quadrant, the initial values might be adjusted in a positive I and a negative Q direction. In this regard, a constellation point being represented in an offset QPSK signal is modified or adjusted from an initial position associated with a first digital representation based on a second digital representation to be encoded. The adjusted constellation point corresponds with signal attributes offsetting the amplitude of the initial I and Q values. Such offset values can be any range of values and is not intended to limit the scope of embodiments of the present invention.

Figure 4:
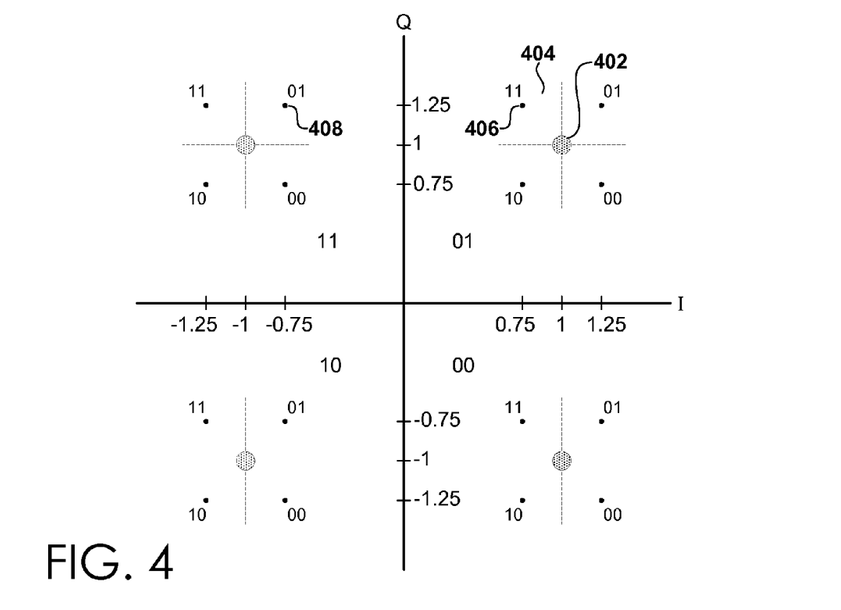

By way of example only, and with reference to FIG. 4. Assume a first eight-bit representation is 01110110 and a second eight-bit representation is 11011000. Now assume that a first digital symbol of the first eight-bit representation to transmit is "01," and a first digital symbol of the second eight-bit representation to transmit is "11." In this regard, to transmit data (i.e., "01" and "11" associated with both eight-bit representations, an offset QPSK signal is utilized that encodes or includes an indication of both digital symbols. As such, with a typical QPSL modulation implementation, the digital symbol 402 of "01" is associated with the first quadrant and, as such, an attribute of 1 for the I signal and 1 for the Q value associated with the first digital symbol "01" are identified. In this regard, 1 times sine of frequency plus 1 times the cosine of frequency would be generated to represent the digital symbol "01" in the QPSK signal.

With continued reference to FIG. 4, in an offset QPSK modulation implementation, the initial value of 1 for the I signal and the initial value of 1 for the Q value associated with the digital symbol 402 of "01" is offset to encode or represent the second digital signal of "11." As the digital signal of "11" is represented in the fourth virtual quadrant 404 as a negative I value from the virtual center and a positive Q value from the virtual center, the initial 1 value for the I signal is decreased and the initial 1 value for the Q signal is increased. For instance, as illustrated in FIG. 4, the offset constellation point of 406 has an offset value for the I signal of 0.75 (reduced 0.25 from 1) and an offset value for the Q signal of 1.25 (increased 0.25 from 1). As previously described the initial values are not restricted to a +1 or −1 value. Rather, the initial values might be +0.5 or −0.5. Similarly, the offset values are not limited to +0.25 or −0.25 but can be any value that is offset enough from a virtual position within the quadrant (e.g., virtual center) to be recognized when the signal is demodulated.

The attribute identifier 220 can be implemented in a number of different manners to identify attributes. For example, in some embodiments, a first digital symbol may be associated with an initial I value (e.g., +1 or −1) and an initial Q value (+1 or −1) while second digital symbols are associated with a offset from the initial I value (+0.25 or −0.25) and an offset from the initial Q value (+0.25 or −25). As such, the attribute identifier 220 can lookup the initial attribute values associated with the first digital symbol and the offset or modification values associated with the second digital symbol and, thereafter, calculate the resulting offset attribute values. In other embodiments, a combination of a first digital symbol and a second digital symbol may be associated with a predetermined offset attribute value. In this way, a first digital symbol of "01" and a second digital symbol of "11" may result in an offset attribute value of 0.75 for the I signal and an offset attribute value of 1.25 for the Q signal, as illustrated in FIG. 4. In another example, a first digital symbol of "11" and a second digital symbol of "01" may result in an offset attribute value of −0.75 for the I signal and an offset attribute value of 1.25 for the Q signal, as illustrated via constellation point 408 of FIG. 4.

The signal generator 224 is configured to generate signals or waveforms (e.g., indicating offset constellation points). In this regard, the signal generator 224 utilizes the identified attributes to alter the waveforms such that the waveforms provide an indication of two digital symbols. That is, each offset QPSK signal or waveform encodes two different digital symbols. The signal generator 224 can multiple the identified I offset signal value by a predetermined waveform (e.g., sine waveform) and multiple the identified Q offset signal value by the corresponding waveform (e.g., cosine waveform). The offset sine and cosine waves can then be simultaneously transmitted as an offset QPSK signal.

By way of example, assume a first digital symbol of "01" and a second digital symbol of "11" correspond with or result in an offset attribute value of 0.75 for the I signal and an offset attribute value of 1.25 for the Q signal. That is, an amplitude of 0.75 for the I signal and an amplitude of 1.25 for the Q signal are identified as signal attributes. The amplitudes can be used to modulate the corresponding sine wave and corresponding cosine wave. In such a case, a sine waveform is multiplied by 0.75, and a cosine waveform is multiplied by 1.25. Such resulting sine and cosine waves are simultaneously transmitted, for example, by the signal generator 224 via an antenna(s) as a offset QPSK signal to the user device 212 to indicate the first digital symbol of "01" and the second digital symbol of "11."

As such, the signal generator 224 can be configured to disturb a pattern and/or create a new pattern that indicates an offset constellation point representing two digital symbols (e.g., based on the quadrant and offset from virtual center). As can be appreciated, each offset QPSK signal can be transmitted for a period of time. Upon transmitting a particular offset QPSK signal for a period of time, a second offset QPSK signal representing two different digital symbols can be transmitted for a period of time A user device, such as user device 212 of FIG. 2, can receive offset QPSK signals directed thereto. The user device 212 may take on a variety of forms, such as a personal computer (PC), a laptop computer, a tablet, a mobile phone, a personal digital assistant (PDA), or any other device that is cable of communicating with other devices. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, a user device is a wireless or mobile device with which a wireless telecommunications network is utilized for communication (e.g., voice and/or data communication). In this regard, the user device communicates with other devices using a wireless telecommunications network(s).

In accordance with utilizing an offset QPSK modulation implementation, the user device 212 may include a receiver 226, a symbol identifier 228, a symbol collector 230, and a data buffer 232. The user device 212 can include any number of components and those specified herein are not intended to limit the scope of the invention. Neither should the user device 212 be interpreted as having any dependency or requirement relating to any one or combination of components illustrated.

The receiver 226 is configured to receive offset QPSK signals. Offset QPSK signals can be received via one or more antennas of the user device. Any number of offset QPSK signals can be received at the receiver 226. In embodiments, a number of a particular offset QPSK signals are received during a period of time followed by another set of offset QPSK signals being received during a second period of time. As described above, offset QPSK signals can be received in the form of an offset sine wave (e.g., having an offset amplitude of I signal) and/or an offset cosine wave (e.g., having an offset amplitude of Q signal).

The symbol identifier 228 is configured to identify digital symbols encoded within offset QPSK signals. In some embodiments, the symbol identifier 228 identifies digital signals by looking up digital signals based on signal attributes of the received offset QPSK signal. As previously indicated, a signal attribute(s) is used to indicate or encode a particular number of bits, such as for example, a digital symbol having two bits.

An offset QPSK signal includes an in-phase signal or waveform (i.e., an I signal) and a quadrature signal or waveform (i.e., a Q signal) that are used in combination to represent two digital symbols. As such, a signal attribute indicating an amplitude value associated with an I signal and a signal attribute indicating an amplitude value associated with a Q signal can be identified in association with a received offset QPSK signal. Such signal attributes, for example, representing an I and Q signal, can be used to identify the corresponding digital signal. Signal attributes can be identified or detected by any component, such as the receiver 226, the symbol identifier 228, or any other component or combination of components of the user device 212.

In one embodiment, the symbol identifier 228 uses signal attributes associated with the received sine and cosine waves, such as amplitude value associated with I signal and amplitude value associated with Q signal, to identify two digital symbols. As such, signal attributes, such as amplitudes of the I and Q signals, can be detected. In some cases, the signal attributes can be used to initially identify a quadrant and/or digital symbol associated with a first digital symbol. For example, a positive I signal and a positive Q signal can be identified as associated with a first quadrant and/or a digital symbol of "01," as in FIG. 4. As another example, a positive I signal and a negative Q signal can be identified as associated with a second quadrant and/or a digital symbol of "00," as indicated in FIG. 4. As such, a first digital symbol of two bits can be identified using the attribute values and, in some cases, an indication of whether the values are positive or negative.

Signal attributes associated with the received sine and cosine waves, such as an amplitude value associated with I signal and an amplitude value associated with Q signal, can also be used to identify the second digital symbol encoded in the offset QPSK signal. In one embodiment, an I and/or Q error value from a virtual center (e.g., a predetermined value) can be used to determine the second digital symbol. In such a case, the values of the virtual center associated with the corresponding quadrant can be used to determine the error value or offset amount. By way of example only, and with reference to FIG. 4, assume that the first quadrant 404 is identified in association with the received offset QPSK signal with the virtual center 402 of the first quadrant 404 having coordinates of 1,1. Further assume that the offset values of the I signal and the Q signal are identified as 1.25 and 0.75, respectively. As such, an error value of 0.25 for the I signal and −0.25 for the Q signal are determined. Such error values of 0.25 for the I signal and −0.25 for the Q signal can be used to identify the second digital symbol as "00."

In other embodiments, a combination of a first digital symbol and a second digital symbol may be associated with a predetermined offset attribute value. In this way, a first digital symbol of "01" and a second digital symbol of "11" may be identified based on detection of an offset attribute value of 0.75 for the I signal and an offset attribute value of 1.25 for the Q signal, as illustrated in FIG. 4. In another example, a first digital symbol of "11" and a second digital symbol of "01" may be identified based on determining an offset attribute value of −0.75 for the I signal and an offset attribute value of 1.25 for the Q signal, as illustrated via constellation point 408 of FIG. 4.

The symbol collector 230 is configured to collect digital symbols. In this regard, upon identification of digital symbols, such digital symbols can be collected by the symbol collector 230. The symbol collector 230 can collect or record digital symbols associated with any number of digital information units and/or data streams. Such digital symbol collection associated with different digital information units and/or data streams may occur sequentially or simultaneously. For example, as the offset QPSK modulation implementation can encode two digital symbols in a single offset QPSK symbol, the symbol collector 230 can collect digital symbols from two different data streams at or near simultaneous in time from one another.

In accordance with collecting digital symbols, the symbol collector 230 can organize or stack the digital symbols in order as the symbols are to be transmitted. Digital symbols can be organized or arranged in association with any number of digital information units and/or data streams. Such digital symbol organization associated with different digital information units and/or data streams may occur sequentially or simultaneously. For example, as the offset QPSK modulation implementation can encode two digital symbols in a single offset QPSK symbol, the symbol collector 230 can organize digital symbols from two different data streams at or near simultaneous in time from one another.

As can be appreciated, although a single symbol collector 230 is illustrated, any number of symbol collectors, or portions thereof, can be utilized to collect or record digital symbols. For example, a first symbol collector may be used to collect digital symbols associated with a first digital information unit (e.g., eight-bit representation) or first data stream while a second symbol collector may be used to collect digital symbols associated with a second digital information unit (e.g., eight-bit representation) or second data stream.

The data buffer 232 of the user device 212 can be used to buffer data. Such a data buffer can temporarily store received data. The data buffer 232 can buffer data associated with any number of data streams and/or any number of digital information units (e.g., sequence of eight bits of binary representations). By way of example only, the data buffer 232 can buffer a first data stream transmitted to the user device 212 and a second data stream transmitted to the user device 212. Each of the first data stream and the second data stream may include multiple digital information units, such as a sequence of eight bits.

Although embodiments described herein are implemented from a transmitter at a base station to a receiver at a user device, as can be appreciated, the implementation of a transmitter at a user device and a receiver at a base station is also contemplated as an aspect of the present invention.

Figure 5:
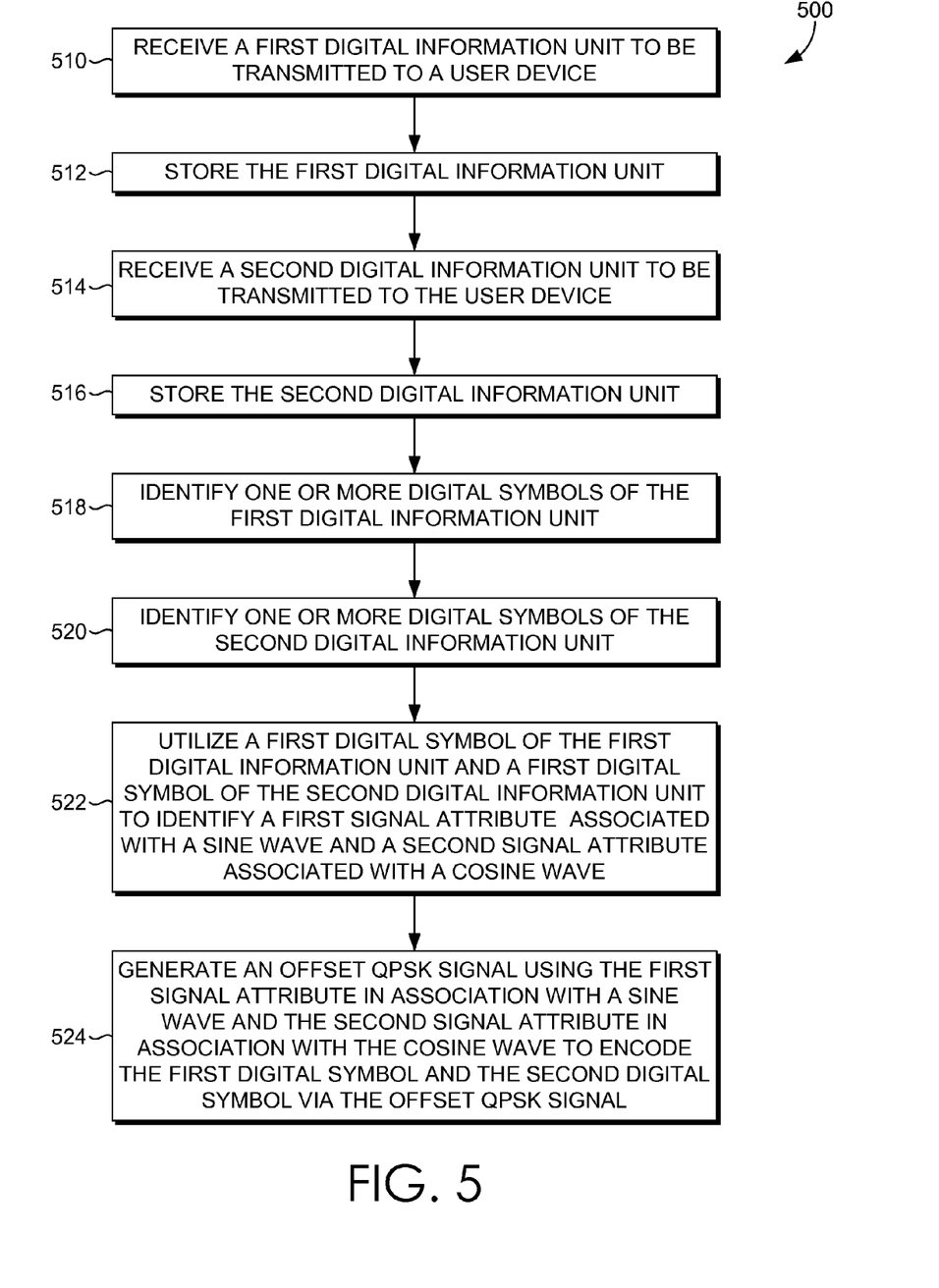
FIG. 5 provides an exemplary first method for facilitating utilization of an offset QPSK signal to transmit two digital symbols, in accordance with an embodiment of the present invention.

With reference to FIG. 5, a flow diagram is shown illustrating a method 500 for facilitating utilization of an offset QPSK signal to transmit two digital symbols, in accordance with an embodiment of the present invention. In embodiments, method 500 can be performed at a transmitter, such as transmitter 216 at the base station 210 of FIG. 2. Initially, as indicated at block 510, a first digital information unit to be transmitted to a user device is received. The first digital information unit is stored at block 512. A second digital information unit to be transmitted to the user device is received and stored, as indicated at block 514 and 516. Each of the first digital information unit and second digital information unit can be a sequence of binary values, such as eight-bit binary value representation. As can be appreciated, the first digital information unit and the second digital information unit can be associated with different data streams or the same data stream.

At block 518, one or more digital symbols of the first digital information unit are identified. Similarly, at block 520, one or more digital symbols of the second digital information unit are identified. Such digital symbols can be a sequence of two bits within the corresponding digital information unit. A first digital symbol of the first digital information unit and a first digital symbol of the second digital information unit are used to identify a first signal attribute associated with a sine wave and a second signal attribute associated with a cosine wave. In embodiments, the first signal attribute and the second signal attribute are amplitudes. For example, the first signal attribute associated with a sine wave can be an amplitude of an in-phase signal, and the second signal attribute associated with a cosine wave can be an amplitude of a quadrature signal. In some implementations, the first signal attribute and the second signal attribute are offset or adjusted based on the second digital symbol from a virtual center of a quadrant associated with the first digital symbol. At block 524, an offset QPSK signal is generated using the first signal attribute in association with the sine wave and the second signal attribute in association with the cosine wave to encode the first digital symbol and the second digital symbol via the offset QPSK signal.

Figure 6:
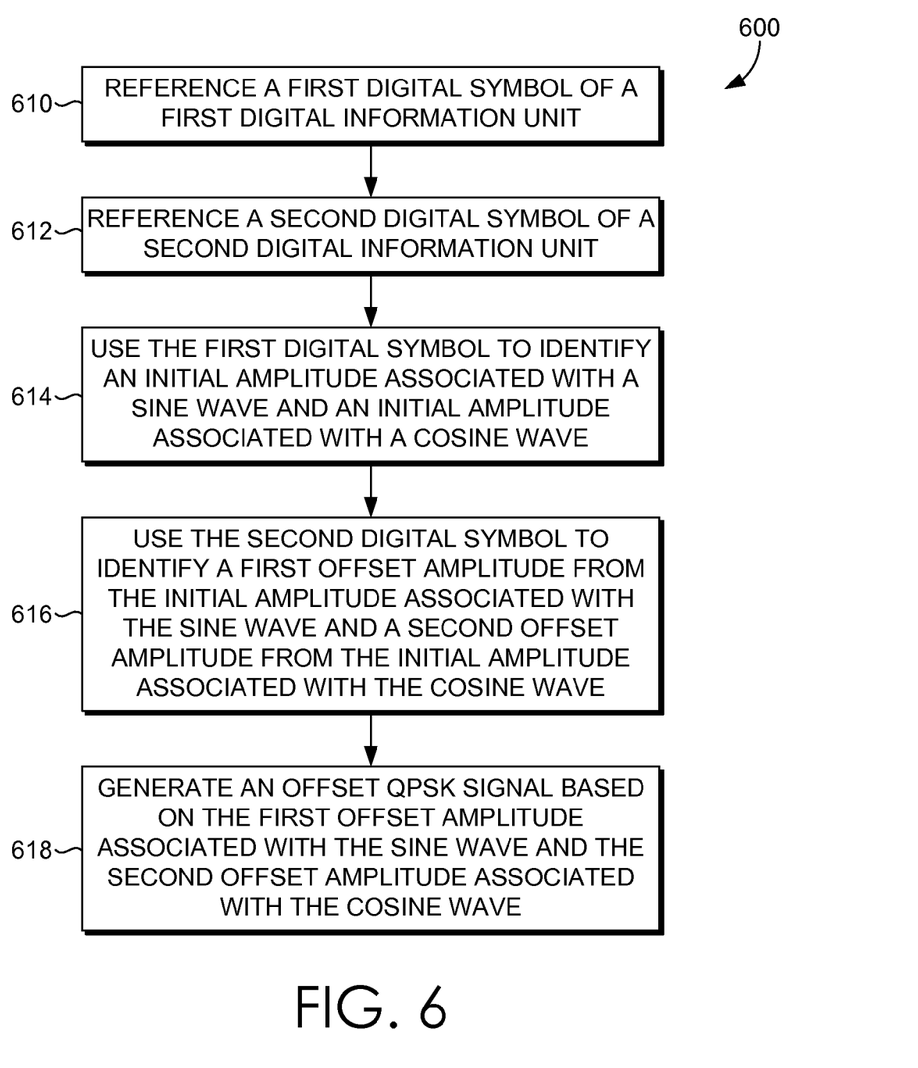
FIG. 6 provides an exemplary second method for facilitating utilization of an offset QPSK signal to transmit two digital symbols, in accordance with an embodiment of the present invention.

Turning now to FIG. 6, a flow diagram is shown illustrating a method 600 for facilitating utilization of an offset QPSK signal to transmit two digital symbols, in accordance with an embodiment of the present invention. In embodiments, method 600 can be performed at a transmitter, such as transmitter 216 at the base station 210 of FIG. 2. Initially, as indicated at block 610, a first digital symbol of a first digital information unit is referenced. Similarly, at block 612, a second digital symbol of a second digital information unit is referenced. Such a first and second digital symbol can be two bits of binary code within an eight-bit representation, for example.

The first digital symbol is used to identify an initial amplitude associated with a sine wave and an initial amplitude associated with a cosine wave. This is indicated at block 614. In some cases, the initial amplitude associated with the sine wave is an amplitude of an I signal, and the initial amplitude associated with the cosine wave is an amplitude of a Q signal. In other cases, the initial amplitude associated with the sine wave is an amplitude of a Q signal, and the initial amplitude associated with the sine wave is an amplitude of a I signal.

At bock 616, the second digital symbol is used to identify a first offset amplitude from the initial amplitude associated with the sine wave and a second offset amplitude from the initial amplitude associated with the cosine wave. In this regard, the second digital symbol is used to modify the initial amplitudes within the quadrant associated with the initial amplitudes such that the modification can reflect or indicate the second digital symbol. Subsequently, at block 618, an offset QPSK signal is generated based on the first offset amplitude associated with the sine wave and the second offset amplitude associated with the cosine wave.

Figure 7:
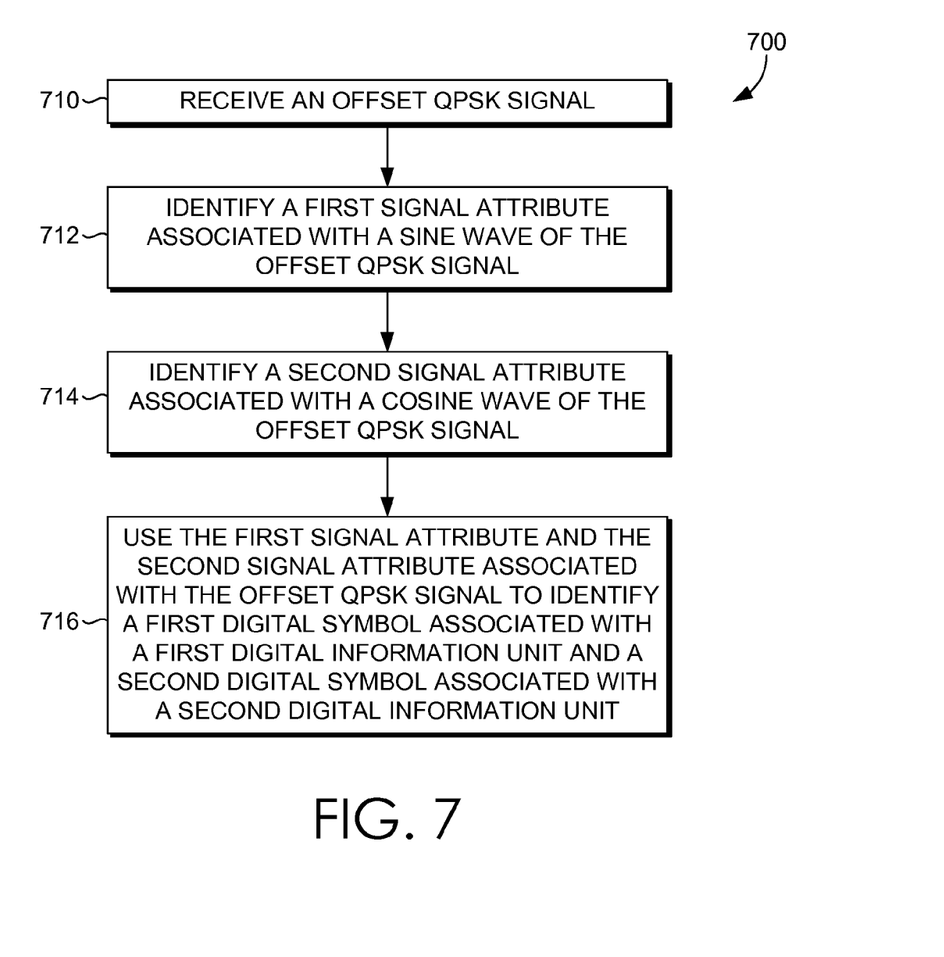
FIG. 7 provides an exemplary method for facilitating utilization of an offset QPSK signal to decode two digital symbols, in accordance with an embodiment of the present invention.

Referring now to FIG. 7, a flow diagram is shown illustrating a method 700 for facilitating utilization of an offset QPSK signal to decode two digital symbols, in accordance with an embodiment of the present invention. In embodiments, method 700 can be performed at a user device, such as user device 212 of FIG. 2. Initially, as indicated at block 710, an offset QPSK signal is received. Thereafter, at block 712, a first signal attribute associated with a sine wave of the offset QPSK signal is identified. Similarly, at block 714, a second signal attribute associated with a cosine wave of the offset QPSK signal is identified. The first and second signal attributes may be, for example, amplitudes of the I and Q signals. Such signal attributes can be detected in any number of manners. At block 716, the first signal attribute and the second signal attribute associated with the offset QPSK signal are used to identify a first digital symbol associated with a first digital information unit and a second digital symbol associated with a second digital information unit.

Such digital symbols can be identified in any number of manners. For example, in one implementation, the first digital symbol can be recognized based on a quadrant associated with the first signal attribute and the second signal attribute. Thereafter, an error value from a virtual center or predetermined position within a quadrant to the constellation point associated with the first and second signal attributes can be used to lookup or identify the second digital symbol. In another implementation, the first signal attribute and the second signal attribute can be used to lookup the first and second digital symbols. In this regard, a pair of signal attributes correspond with a pair digital symbols. By way of example and with reference to FIG. 4, an I-value signal attribute of 0.75 and a Q-value signal attribute of 1.25 corresponds with a first digital symbol of 01 and a second digital symbol of 11. As another example, an I-value signal attribute of −1.25 and a Q-value signal attribute of −0.75 corresponds with a first digital symbol of 10 and a second digital symbol of 11.

It will be understood by those of ordinary skill in the art that the order of steps shown in the method 500 of FIG. 5, method 600 of FIG. 6, and method 700 of FIG. 7 are not meant to limit the scope of the present invention in any way and, in fact, the steps may occur in a variety of different sequences within embodiments hereof. Any and all such variations, and any combination thereof, are contemplated to be within the scope of embodiments of the present invention.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-readable storage media having computer-executable instructions embodied thereon that, when executed, perform a method for facilitating transmission of offset quadrature phase-shift keying (QPSK) signals indicating two digital symbols, the method comprising:
mapping each of a plurality of predetermined digital symbol pairs with a respective one of a plurality of signal amplitude pairs, wherein each predetermined digital symbol pair comprises a first two-bit binary value and a second two-bit binary value, and wherein each signal amplitude pair comprises a first signal amplitude and a second signal amplitude;
receiving a first digital information unit and a second digital information unit comprising a first sequence of bits and a second sequence of bits, respectively;
utilizing a first digital symbol of the first digital information unit and a first digital symbol of the second digital information unit as a first digital symbol pair, and based on the mapping between each of the plurality of predetermined digital symbol pairs and the respective one of the plurality of signal amplitude pairs, identifying a first signal amplitude pair from the plurality of signal amplitude pairs that corresponds to the first digital symbol pair;
generating an offset QPSK signal from a sine wave and a cosine wave using the first signal amplitude in the first signal amplitude pair to modulate the sine wave and the second signal amplitude in the signal amplitude pair to modulate the cosine wave, wherein the modulated sine wave and the modulated cosine wave encode both the first digital symbol of the first digital information unit and the first digital symbol of the second digital information unit concurrently within the offset QPSK signal.

2. The media of claim 1, wherein the first signal amplitude and the second signal amplitude are offset from a first predetermined value and a second predetermined associated with the first digital symbol of the first digital information unit.

3. The media of claim 2, wherein the first predetermined value corresponds with an in-phase value of a virtual center within a quadrant associated with the first digital symbol of the first digital information unit, and the second predetermined value corresponds with a quadrature value of the virtual center within the quadrant associated with the first digital symbol of the first digital information unit.

4. The media of claim 1, wherein the first signal amplitude comprises an amplitude of an in-phase signal and the second signal amplitude comprises an amplitude of a quadrature signal.

5. The media of claim 1, wherein the first signal amplitude comprises an amplitude of a quadrature signal and the second signal amplitude comprises an amplitude of an in-phase signal.

6. The media of claim 1, wherein the first digital information unit comprises a first eight-bit representation and the second digital information unit comprises a second eight-bit representation.

7. The media of claim 6 wherein the first eight-bit representation corresponds with a first data stream and the second eight-bit representation corresponds with a second data stream.

8. A method for facilitating transmission of offset quadrature phase-shift keying (QPSK) signals indicating two digital symbols, the method comprising:
using a first two-bit portion of a first eight-bit binary value to identify an initial amplitude associated with a sine wave and an initial amplitude associated with a cosine wave;
using a second two-bit portion of a second eight-bit binary value to
A) identify a first offset amplitude associated with the sine wave, the first offset amplitude corresponding to a sum of the initial amplitude associated with the sine wave and a first offset value associated with the second two-bit portion, and
B) identify a second offset amplitude associated with the cosine wave, the second offset amplitude corresponding to a sum of the initial amplitude associated with the cosine wave and a second offset value associated with the second two-bit portion; and
generating an offset QPSK signal based on the first offset amplitude associated with the sine wave and the second offset amplitude associated with the cosine wave, the offset QPSK signal indicating the first two-bit portion and the second two-bit portion concurrently.

9. The method of claim 8, wherein the initial amplitude associated with the sine wave comprises an amplitude of an in-phase signal and the initial amplitude associated with the cosine wave comprises an amplitude of a quadrature signal.

10. The method of claim 8, wherein the initial amplitude associated with the sine wave comprises an amplitude of a quadrature signal and the initial amplitude associated with the cosine wave comprises an amplitude of an in-phase signal.

11. The method of claim 8, wherein the offset QPSK signal is generated by multiplying the first offset amplitude with the sine wave and multiplying the second offset amplitude associated with the cosine wave.

12. The method of claim 8, wherein the offset QPSK signal is transmitted to a user device.

13. A method for facilitating utilization of an offset quadrature phase-shift keying (QPSK) signal to decode two digital symbols, the method comprising:
receiving at a user device an offset QPSK signal including an in-phase sinusoidal component ("I signal") and a quadrature sinusoidal component ("Q signal");
detecting an amplitude associated with the I signal and an amplitude associated with the Q signal,
wherein the detected amplitude associated with the I signal represents a sum of
A) an in-phase amplitude associated with a first digital symbol, and
B) an offset value associated with a second digital symbol, and
wherein the detected amplitude associated with the Q-signal represents a sum of
A) a quadrature amplitude associated with the first digital symbol, and
B) a quadrature offset value associated with the second digital symbol; and
using the amplitude associated with the I signal and the amplitude associated with the Q signal in combination to identify the first digital symbol, wherein the first digital symbol is associated with a first digital information unit and to identify the second digital symbol, wherein the second digital symbol is associated with a second digital information unit.

14. The method of claim 13, wherein the amplitude associated with the I signal is an amplitude of a sine waveform and the amplitude associated with the Q signal is an amplitude of a cosine waveform.

15. The method of claim 13, wherein the amplitude associated with the Q signal is an amplitude of a sine waveform and the amplitude associated with the I signal is an amplitude of a cosine waveform.

16. The method of claim 13, wherein the first digital symbol comprises a two-bit value of the first digital information unit, and the second digital symbol comprises a two-bit value of the second digital information unit.

17. The method of claim 16, wherein the first digital information unit comprises an eight-bit binary value, and the second digital information unit comprises an eight-bit binary value.

18. The method of claim 17, wherein the first digital information unit corresponds with a first data stream being transmitted to the user device, and the second digital information unit corresponds with a second data stream being transmitted to the user device.

19. The method of claim 13:
wherein identifying the first digital symbol includes
  A) identifying a quadrant in a constellation diagram based on the in-phase amplitude associated with the first digital symbol and the quadrature amplitude associated with the first digital symbol, and
  B) determining that the identified quadrant is mapped to the first digital symbol, and
wherein identifying the second digital symbol includes
  A) identifying an offset constellation point in the identified quadrant based on the offset value associated with the second digital symbol and the quadrature offset value associated with the second digital symbol, and
  B) determining that the identified offset constellation point is mapped to the second digital symbol.

20. The method of claim 13, wherein identifying the first digital symbol and identifying the second digital symbol includes utilizing the amplitude associated with the I signal and the amplitude associated with the Q signal as a signal amplitude pair, accessing a mapping between predetermined digital symbol pairs and respective signal amplitude pairs to identify a predetermined digital symbol pair that includes the first digital symbol and the second digital symbol.

* * * * *